United States Patent

[11] 3,568,170

[72] Inventors Louis Catalani, Jr.
Hawthorne;
Thomas J. Gilligan, Palos Verdes, Calif.

[21] Appl. No. 730,821
[22] Filed May 21, 1968
[45] Patented Mar. 2, 1971
[73] Assignee Electronic Memories, Incorporated
Hawthorne, Calif.

[54] CORE MEMORY DRIVE SYSTEM
16 Claims, 3 Drawing Figs.

[52] U.S. Cl. .......... 340/174, 307/255, 307/270
[51] Int. Cl. .......... G11c 7/00, G11c 11/06
[50] Field of Search .......... 340/174 (M), 174 (CDC); 307/270, 253, 254

[56] References Cited

UNITED STATES PATENTS

| | | | |
|---|---|---|---|
| 3,466,633 | 9/1969 | Gilligan et al. | 340/174 |
| 3,009,070 | 11/1961 | Barnes | 307/254 |
| 3,130,326 | 4/1964 | Habisohn | 307/88.5 |
| 3,165,642 | 1/1965 | Noll | 307/88.5 |
| 3,192,510 | 6/1965 | Flaherty | 340/174 |
| 3,360,788 | 12/1967 | Lo Casale et al. | 340/174 |
| 3,383,526 | 5/1968 | Berding | 307/270 |
| 3,445,831 | 5/1969 | Cooper et al. | 340/174 |

*Primary Examiner*—James W. Moffitt
*Attorney*—Lindenberg, Freilich & Wasserman

ABSTRACT: A core memory drive system with direct coupling to a decoder is provided by: a first bank of sink-drive switches, one switch for each of *M* decoder output signals selecting a group of *N* lines; and a second bank of sink-drive switches, one switch for each of *N* decoder output signals selecting the other end of one line of a group of lines selected by the first bank of switches. A current pulse is applied directly to the switches of the first bank for a store operation, and a current pulse is applied directly to the switches of the second bank for a read operation. Each switch comprises a switching transistor and two other transistors directly connected to the switching transistor and a group of lines. At least one blocking diode isolates the two transistors connected to a group of lines. Additional diodes are provided to prevent sneak current paths in the memory array.

*INVENTORS*
LOUIS CATALANI, JR.
THOMAS J. GILLIGAN
*BY* Lindenberg + Freilich
ATTORNEYS INVENTORS
LOUIS CATALANI, JR.
THOMAS J. GILLIGAN
BY Lindenberg + Freilich
ATTORNEYS

CORE MEMORY DRIVE SYSTEM

BACKGROUND OF THE INVENTION

1. Field of the Invention

This invention relates to magnetic core memories and more particularly to a core memory drive system.

2. Description of the Prior Art

Magnetic core drive systems have been provided in many configurations for the purpose of selectively driving current through one of a plurality of lines passing through rows or columns of cores or both, in one direction for a store operation and in the other direction for a read operation. Coincident-current memories and linear-select memories are but two examples of memories which employ such drive systems.

In coincident-current memories, it is necessary to drive current in one direction through a row of cores simultaneously with current through a column of cores. The current in each line is only half that necessary to switch a core from one state of residual flux ($\pm \Phi_r$) to the other. Since only one core of the array has two half-select currents passing through it in the same direction only one core is switched to store a binary digit therein. To read the binary digit thus stored, the direction of the two half-select currents is reversed.

It is customary to address the lines by binary numbers and to employ decoders to select the lines through which currents are to be driven for a read or a store operation. A difficulty in designing a selectively addressable core memory is the provision of bipolar switches responsive to output signals from the decoders for both store and read operations.

Transformer coupled switches have been employed using a pair of transistors at each end of a line through which current is to be driven in alternate directions. At one end, the two transistors have their base-emitter junctions transformer coupled to store and read timing signals through diode switches such that only one of the two transistors will conduct during a store or read operation. The diode switches are employed to enable the store, or read, timing pulse to be applied to a primary winding of a transformer only when the line connected to the two transistors is being addressed. One transistor has its emitter connected directly to the line and the other transistor has its collector connected directly to the line. Each functions as a current sink when its base-emitter junction is forward biased.

A second pair of transistors is connected to the other end of the line in a similar manner such that only one transistor will conduct in response to a store and read timing pulse when the line is being addressed. A current source of one polarity is connected to the collector of the transistor having its emitter connected to the line and a current source of the opposite polarity is connected to the emitter of the other transistor. Thus, current from a drive switch on one end of the line is selectively conducted through a sink switch on the other end of the line. The current is in one direction for a store operation and in the other for a read operation. For a memory array of 4096 cores, each is advantageously connected to a group of eight lines. One of the eight lines is then selected by addressing a sink switch on the other end of the line. Thus a group of drive switches is provided, one switch for each of eight decoder output signals, each switch selecting a group of eight lines for a given read or store operation. A group of sink switches is then provided, one for each of eight decoder output signals, each selecting one line out of each of the eight groups of lines. Only one transistor in each of the two switches selected is enabled by a current pulse for a store or a read operation, one in a drive switch and one in a sink switch. To prevent sneak current paths through undesired lines connected to the selected drive and sink switches, blocking diodes are employed, one for each line connected to a drive switch.

A major objection to the transformer coupled drive systems of the type just described has been the necessity of transformer coupling. This objection has become more pronounced with the advent of integrated circuits and the desire to reduce the space required for a core memory by including in one printed circuit card address registers, decoders switches and blocking diodes. Moreover, since the address signals are transformer coupled to the switches, it is necessary to time and steer the address signals to the primary windings of the transformers.

OBJECTS AND SUMMARY OF THE INVENTION

A primary object of the present invention is to provide a direct coupled core memory drive system.

Briefly, in accordance with the invention a pair of addressable drive-sink switches are connected to opposite ends of a core memory line. Each switch comprises first and second transistors of one conductivity type having their base electrodes connected to an address decoder by a third transistor of an opposite conductivity type connected in a common-emitter configuration.

The first transistor has its emitter connected to the line being addressed and its collector connected to a source of reference potential. The second transistor has its emitter connected to a timed read pulse generator or a timed store pulse generator, and its collector connected to the line by at least one blocking diode. The first transistor functions as a current sink while the second transistor functions as a current driver. Thus, once one switch at each end of a line has been addressed, current is automatically driven through the line in one of two directions, depending upon which pulse generator receives a timing signal.

Each of a plurality of *M* drive-sink switches on one side of an array is connected to *N* lines, and each of a plurality of *N* drive-sink switches on the other side is connected to *M* lines, one line out of each of *M* groups of *N* lines. In that manner, *MN* lines may be selectively addressed with just $M + N$ switches. As in the prior art, a given line is uniquely defined by addressing two switches, one on each side of the array, but the address signals and the current sources are DC coupled to the switchs. Diodes are employed to couple both transistors of each of the *M* drive-sink switches to all of its *N* lines. Those connecting one transistor are poled one way, and those connecting the other transistor are poled the other way to prevent sneak current paths through unselected lines.

For a coincident-current core memory, the pattern is repeated for a second set of lines, and for an expanded array, the pattern may be enlarged either by connecting more lines to each of the drive-sink switches or by repeating the pattern for each set of lines as necessary.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
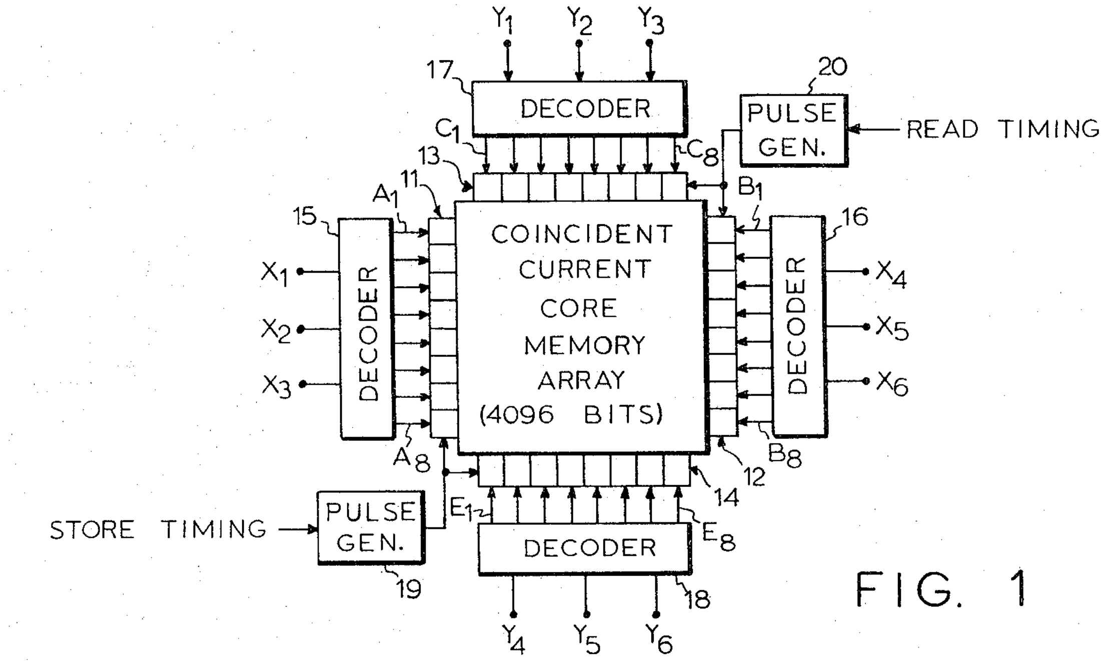
FIG. 1 illustrates a block diagram of a coincident-current core memory plane having 4096 cores selectively addressable by 12 binary digits in accordance with the present invention.

FIG. 1 illustrates the organization of a coincident-current core memory array for selectively addressing one out of 4096 cores through banks of novel sink-drive switches 11 to 14 in accordance with the present invention. Six binary digits at terminals $X_1$ to $X_6$ are employed to address a row of cores and six binary digits at terminals $Y_1$ to $Y_6$ are employed to address a column of cores. A pair of decoders 15 and 16 are employed to uniquely address one out of eight input terminals $A_1$ to $A_8$ to the bank of sink-drive switches 11 and one out of eight input terminals $B_1$—$B_8$ of the bank of sink-drive switches 12. The input terminals $A_1$—$A_8$ are employed to select eight groups of eight lines each, and each of the input terminals $B_1$—$B_8$ is employed to select a group of eight lines, each line from a different one of the eight groups addressed by the terminals $A_1$—$A_8$. In that manner, one out of 64 rows is uniquely addressed for a store or a read operation.

One out of 64 columns is selected in a similar manner. A decoder 17 receives three binary digits at input terminals $Y_1$, $Y_2$ and $Y_3$ and transmits an address signal to one of eight input terminals $C_1$—$C_8$ connected directly to the bank of sink-drive switches 13. A decoder 18 receives three binary digits at input terminals $Y_4$, $Y_5$ and $Y_6$ and transmits an address signal to one of eight input terminals $E_1$—$E_8$ connected directly to the bank of sink-drive switches 14.

Store timing signals are applied to a pulse generator 19 which transmits current pulses to banks of sink-drive switches 11 and 14 while read timing signals are applied to a pulse generator 20 which transmits current pulses to the banks of sink-drive switches 12 and 13. For a store operation, a store timing signal energizes an addressed switch in the bank 11 and an addressed switch in the bank 14 to drive current through two lines uniquely selected by all four banks of sink-drive switches 11 to 14. The addressed switches in the banks of sink-drive switches 12 and 13 function as sinks for the currents driven through the selected lines. Thus, for a store operation the banks of switches 11 and 14 each have one switch armed to transmit a store timing pulse to selected lines while banks of sink-drive switches 12 and 13 each have a switch armed to conduct current driven through the selected lines to a source of reference potential or ground. Thus, timing signals need not be provided prior to decoding address signals and selecting sink-drive switches. Instead, the timing signals are applied to the store pulse generator 19.

For a read operation, the roles of the addressed switches are reversed. The switches addressed in the banks 12 and 13 are armed to transmit a read pulse from generator 20 through selected lines. The switches addressed in the banks 11 and 14 are armed to conduct current driven through the selected lines to ground. All of this is accomplished without the use of transformers, i.e., with direct connections between the banks of sink-drive switches and the output terminals of the decoders 15 to 18. As for the store operation, a timing signal is applied only to the read pulse generator 20.

Figure 2:
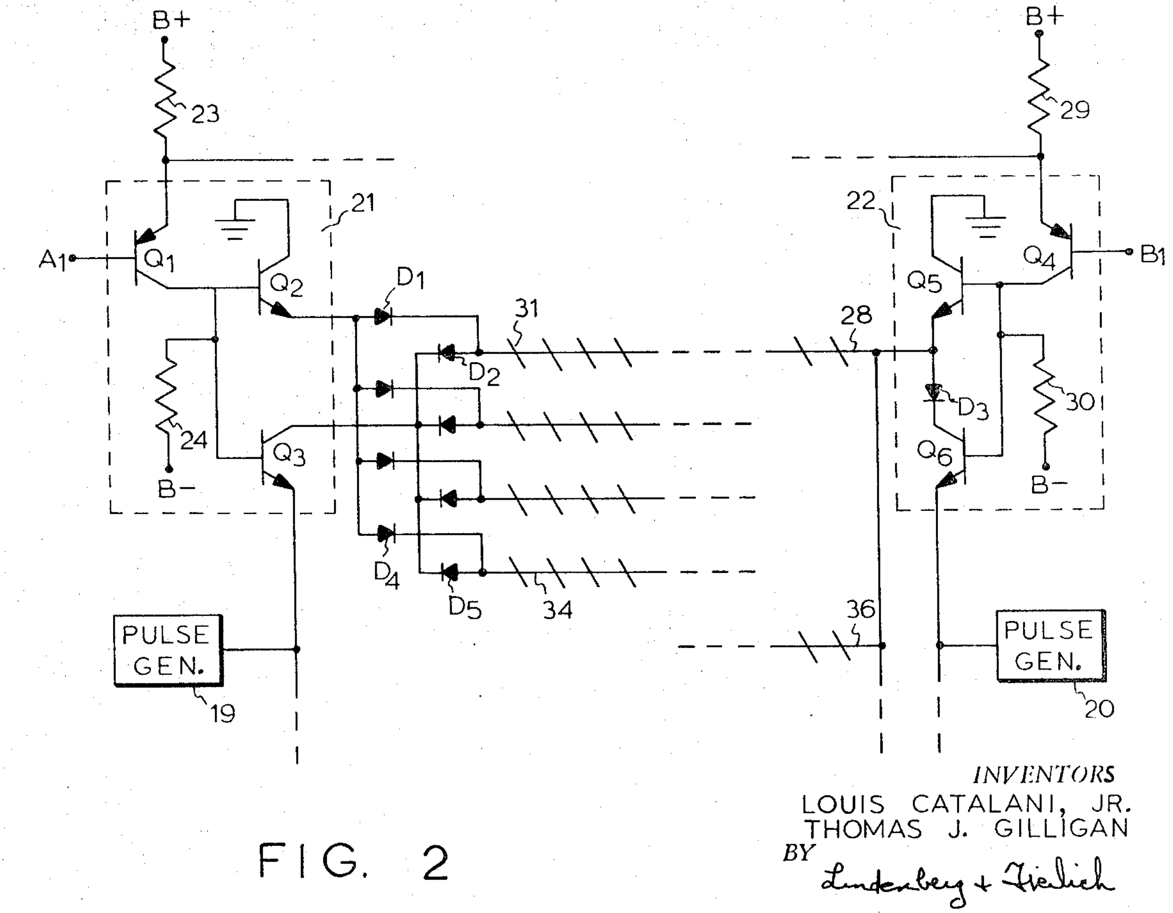
FIG. 2 is a schematic diagram illustrating the manner in which novel sink-drive switches are directly connected to address decoder terminals and pulse generator terminals.

FIG. 2 illustrates one switch 21 and switch 22 of the respective banks of switches 11 and 12 of FIG. 1. The switch 21 consists of a PNP transistor $Q_1$ having: its base connected directly to the output terminal $A_1$ of the decoder 15; its emitter connected to a defined circuit source comprising a source of potential (+5 volts) and a resistor 23 common to all other switches of the bank 11 which are identical to the switch 21; and its collector connected to the base electrodes of NPN transistors $Q_2$ and $Q_3$. QA resistor 24 connects the bases of transistors $Q_2$ and $Q_3$ to a source of negative bias potential (−6 volts). The emitter of transistor $Q_2$ is connected to a line 28 through a diode $D_1$, and the collector of transistor $Q_3$ is connected to the line 28 through a diode $D_2$.

The diode $D_1$ is poled for conduction through the line 28 to the right in response to a negative read pulse received from generator 20 connected to the switch 22. The collector of transistor $Q_2$ is connected to a source of reference potential (circuit ground) to complete the current path for a read operation. For a store operation, a negative pulse from the generator 19 is applied to the emitter of transistor $Q_3$ in switch 21, and to the emitters of all other switches of the bank 11.

To address switch 21, the decoder 15 lowers the terminal $A_1$ from about +5 volts to about +0.5 volts, thereby forward biasing the base-emitter junction of transistor $Q_1$. Once transistor $Q_1$ is thus switched into conduction, the transistors $Q_2$ and $Q_3$ are armed by the defined current source. When a negative store pulse is received from generator 19, there is a complete path for base current in transistor $Q_3$ so that it conducts current through the line 28. The collector of transistor $Q_3$ is free to move with the e.m.f. of self-induction in the line 28 without any significant effect on its base current due to the high output impedance of transistor $Q_1$ and the collector voltage capability of transistors $Q_1$ and $Q_2$. Thus, the collector of transistor $Q_1$ is shifted in a negative direction from about 0 volts to hold transistor $Q_2$ off. Meantime, a voltage drop across resistor 23 due to conduction of transistor $Q_1$ holds all other switches in the bank 11 cutoff.

Referring now to the switch 22, a transistor $Q_4$ is turned on by an address signal of about +0.5 volts at terminal $B_1$, and a resistor 29 connected to the emitter of the transistor $Q_4$ holds corresponding transistors of all other switches at the bank 12 cutoff since all are similarly connected thereto. The collector of transistor $Q_4$ connected to a source of negative bias potential (−6 volts) by a resistor 30 then becomes less negative and reaches substantially 0 volts, thus arming transistors $Q_5$ and $Q_6$ in response to a defined current source comprising resistor 29 and a source of potential (+5 volts). The construction and operation of switch 22 is similar to switch 21. In the absence of a negative current pulse from the generator 19 and generator 20, collector current of transistor $Q_4$ is through the resistor 30.

When a store pulse is received from generator 19, and not generator 20, the collector current of transistor $Q_4$ is through the base-emitter junction of transistor $Q_5$ and line 28. A diode $D_3$ is connected between the emitter of transistor $Q_5$ and the collector of transistor $Q_6$ so that the PN junction between the base and collector of the transistor $Q_6$ will not deprive the transistor $Q_5$ of any base current. In other words, the diode $D_3$ blocks any current from flowing through the base-collector junction of transistor $Q_6$ when the base-emitter junction of transistor $Q_5$ is forward biased.

The magnitude of the store pulse from generator 19 is selected to provide only half the current necessary to switch the cores through which the line 28 passes, such as core 31. A separate line (not shown) is similarly selected by the banks of sink-drive switches 13 and 14 to conduct half-select current in the same direction through the core 31 to switch it, as will be described more fully with reference to FIG. 3.

For a read operation, a half-select read pulse from generator 20 will turn transistor $Q_6$ on. The collector of transistor $Q_4$ becomes negative, thereby holding the transistor $Q_5$ cutoff. When the transistor $Q_6$ conducts, the emitter of transistor $Q_2$ in the switch 21 becomes negative. That turns the transistor $Q_2$ on to complete the current path through the line 28 in a direction opposite the current flow for a store operation. Thus, switches 21 and 22 are similar in construction, but complementary in operation because a current pulse is applied to an emitter of only one at any given time.

Diode $D_2$ performs the same function for switch 21 during a read operation as diode $D_3$ does for switch 22 during a store operation, i.e., it presents the PN junction between the base and collector of transistor $Q_3$ from depriving the transistor $Q_2$ of any base current.

Other lines are connected to the emitter of transistor $Q_2$ by diodes, such as a line 34 by a diode $D_4$, and to the collector of transistor $Q_3$, such as the line 34 by a diode $D_5$. The diodes connected to the emitter of transistor $Q_2$ are poled for conduction during a read operation, and the diodes connected to the collector of transistor $Q_3$ are poled for conduction during a store operation. As many lines as desired may be connected to the switch 21, but for convenience in addressing them with a binary number, the number of lines connected should be a power of two. With eight switches in the bank 11 (FIG. 1), one switch for each of the input terminals $A_1$—$A_8$, the number of lines connected to each gate should be eight for an array of 4096 cores. In that manner 64 lines are selected in groups of eight by the bank 11. But for convenience, only four lines are shown in FIGS. 2 and 3 for a 16 × 16 array of cores.

Similarly, other lines are connected to the emitter of transistor $Q_5$ of the switch 22, such as line 36. With eight switches in the bank 12 (FIG. 1), one switch for each of the input terminals $b_1$—$B_8$ the number of lines should be eight to select 64 lines in groups of eight for a full array of 4096 cores. However, in order to uniquely select one line by addressing one switch in each of the banks 11 and 12, each line connected to a switch in the bank 12 must be from different ones of the groups of eight connected to switches in the bank. However, to illustrate the pattern to be followed in connecting switches to lines, only four lines are connected to each of four switches as shown in FIG. 3 for a 256 core array.

Figure 3:
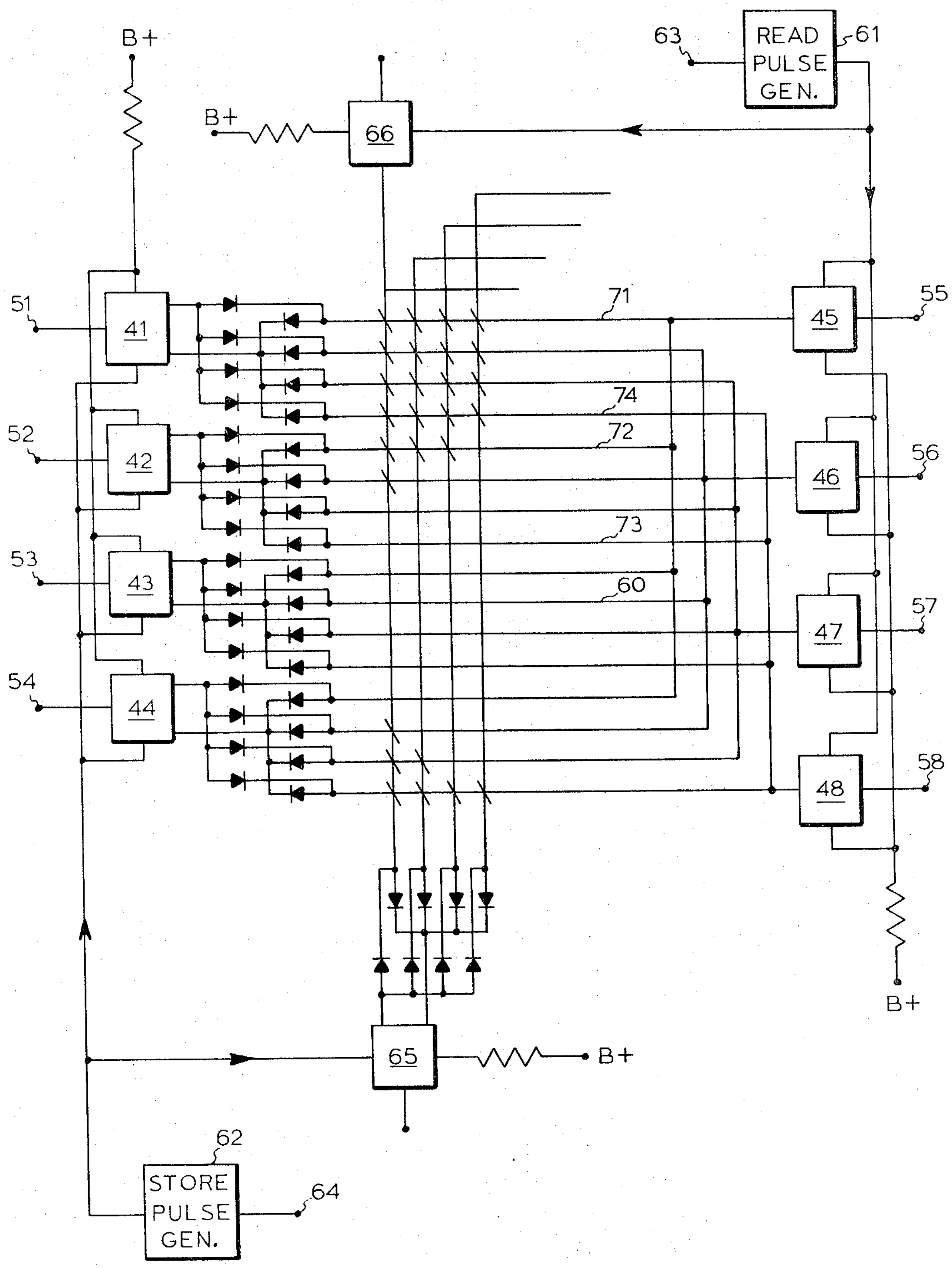
FIG. 3 is a schematic diagram illustrating the manner in which the novel sink-drive switches of FIG. 2 may be employed to selectively address cores in a $16 \times 16$ array of a coincident-current core memory.

Referring now to FIG. 3, lines for only the first four columns are shown since the pattern is the same as for the 16 rows. Referring then only to the rows, a 4-bit number is decoded to address one of four switches 41 to 44 on the left and one of four switches 45 to 48 on the right. The addressing signals are received on terminals 51 to 58 of switches 41 to 48 represented in block diagram form. The switches 41 to 44 are the same as switch 21 of FIG. 2 and the switches 45 to 48 are the same as switch 22 of FIG. 2. The two groups of switches then correspond to banks 11 and 12 of FIG. 1.

The lines are connected to the switches 41 to 44 in first groups of four starting from the top. The switch 45 is connected to the first line of each of the groups of four connected to the four switches 41 to 44. The second switch 46 is connected to the second line of each of the groups of four, and so on. To select a given line, such as line 60 (the second line in the third group), the third switch on the left (switch 43) is addressed together with the second switch on the right (switch 46). A column is simultaneously selected in a similar manner. Read and store operations are then selectively performed when a read pulse generator 61 and a store pulse generator 62 receive timing pulses at respective terminals 63 and 64 from a timing control section (not shown). For a coincident current memory, the read and store pulses are also applied to column select switches. For simplicity in the drawing only a column switch 65 connected to the store pulse generator 62 and a column switch 66 connected to the read pulse generator 61 are shown. The switch 66 is the same as switches 45 to 48 and is one of a bank of four which correspond to the bank of switches 13 in FIG. 1. Similarly, switch 65 is the same as switches 41 to 44 and is one of a bank of four which correspond to the bank of switches 14 in FIG. 1.

The function of the blocking diodes in each line connected to the switches 41 to 44 may be readily appreciated from the pattern of FIG. 3. For instance, if current were to be selectively driven across the line 71 to switch 41 (from right to left), a parallel path could be traced, in the absence of the diodes, down and along line 72, down and back along line 73 and then up and along line 74 to the switch 41. While current following such a tortuous path would not be sufficient to provide half-select current for another core in the same column (but different row) to switch it, the current would be sufficient to disturb it. Such disturbance would make design of the memory plane difficult in terms of requisite inhibit current for store operations, noise cancellation and power for the drive pulse generators. Accordingly, blocking diodes are preferably employed. The blocking diodes poled for store pulse currents also function to prevent loss of base current in the sink transistors of switches 41 to 44 as described with reference to diode $D_2$ and switch 21 in FIG. 2. Otherwise, the base collector PN junction of the drive transistor $Q_3$ may deprive the sink transistor $Q_2$ of base current.

In an embodiment of the system illustrated in FIG. 1, the emitter resistor 23 (FIG. 2) common to all switches in the bank 11 and the emitter resistor 29 (FIG. 2) common to all switches in the bank 12 were each selected to have a resistance value of 120 ohms using PNP transistors of the type 2N3640. The resistors 24 and 30 connected to the respective PNP transistors $Q_1$ and $Q_4$ (FIG. 2) were each selected to have a resistance value of 2.2 $\kappa$ ohms. However, it should be understood that these values are typical with B+ and B− equal to +5 and −6 volts, respectively, and not critical. In addition to those resistors, a single resistor may be connected between ground and the collectors of transistors $Q_2$ and $Q_5$ of all switches to dampen any ringing that may occur in the flow of current through any one of the transistors $Q_2$ and $Q_5$. However, that is not essential, and in the actual reduction to practice of the system, such a resistor having the very nominal value of 2.2 ohms was employed to facilitate placing a larger resistor in the printed circuit card if needed.

Although particular embodiments of the invention have been described and illustrated herein, it is recognized that modifications and variations may readily occur to those skilled in the art, such as substitution of other active elements or transistors of opposite conductivity types. Consequently, it is intended that the claims be interpreted to cover such modifications and equivalents.

We claim:

1. In a core memory drive system, a pair of addressable drive-sink switches connected to opposite ends of a line, each switch comprising:
- a drive current source selectively turned on with a polarity necessary for forward biasing the base-emitter junction of a transistor of a given conductivity type when connected to the emitter thereof;
- a first transistor of said given conductivity type having its collector connected to a first source of bias potential and its emitter connected to one end of said line;
- a second transistor of said given conductivity type having its emitter connected to said drive current source, its collector connected to the emitter of said first transistor and its base connected to the base of said first transistor;
- a second source of bias potential of a polarity and magnitude sufficient to bias said first and second transistors off even when said drive current source is turned on;
- a first impedance means coupling said second source of bias potential to the base of each of said first and second transistors;
- a defined current source comprising a source of potential of a polarity opposite said second source of bias potential and a second impedance means connected thereto; and
- switch control means connected in series between said second impedance means and the base of said first and second transistors for selectively connecting said second impedance means in series with said first impedance means, the ratio of said first and second impedance means being selected to enable said second transistor to conduct only when said drive current source is turned on, and to enable said first transistor to conduct only when a drive current source connected to the emitter of a second transistor of a drive-sink switch connected to the other end of said line is turned on.

2. Apparatus as defined by claim 1 including a unidirectional conducting device connected in series between the collector of said second transistor and the emitter of said first transistor, said device being poled for conduction only when said second transistor conducts in response to said current source connected to the emitter thereof being turned on.

3. Apparatus as defined by claim 1 including memory address decoding means, and wherein said switch control means comprises a third transistor of a conductivity type complementary to said first and second transistors, said third transistor having its collector connected to the base of said first and second transistors, its emitter connected to said second impedance means and its base to said memory address decoding means.

4. Apparatus as defined by claim 3 including a unidirectional conducting device connected in series between the collector of said second transistor and the emitter of said first transistor, said device being poled for conduction only when said second transistor conducts in response to said current source connected to the emitter thereof being turned on.

5. Apparatus as defined by claim 1 wherein said first and second impedance means each comprises a resistor.

6. Apparatus as defined by claim 1 including: *MN* lines, where *M* and *N* are integers; a first group of *M* drive-sink switches, each having the emitter of its first transistor connected to a unique group of *N* lines at one end thereof; and a second group of $N$ drive-sink switches, each having the emitter of its first transistor connected to a unique group of $M$ lines being selected from a different group of $N$ lines, whereby $MN$ lines may be selectively addressed with $M+N$ drive-sink switches.

7. Apparatus as defined by claim 6 including a unidirectional conducting device in each drive-sink switch connected in series between the collector of said second transistor and the emitter of said first transistor thereof, said device being poled for conduction only when said second transistor thereof conducts in response to said current source connected to the emitter thereof being turned on.

8. Apparatus as defined by claim 6 including a pair of series connected unidirectional conducting devices for connecting each line to one of said first plurality of drive-sink switches, one device connecting a given line to the emitter of said first transistor in a drive-sink switch and one device connecting said given line to the collector of said second transistor in said drive-sink switch, said line being connected to a junction between said pair of devices, said pair of device being poled for conduction of currents of opposite direction through said lines, and said pair of devices being connected in series between the emitter of said first transistor and the collector of said second transistor.

9. Apparatus as defined by claim 8 including a unidirectional conducting device in each of said second plurality of drive-sink switches in series between the collector of said second transistor and the end of said line to which connected, said device being poled for conduction only when said second transistor thereof conducts in response to said current source connected to the emitter thereof being turned on.

10. Apparatus as defined by claim 6 wherein said switch control means of each drive-sink switch comprises a third transistor of a conductivity type complementary to said first and second transistors, said third transistor having its collector connected to the base of said first and second transistors, its emitter connected to said second impedance means and its base to said memory address decoding means.

11. Apparatus as defined by claim 10 including a unidirectional conducting device connected in series between the collector of said second transistor and the emitter of said first transistor, said device being poled for conduction only when said second transistor conducts in response to said current source connected to the emitter thereof being turned on.

12. Apparatus as defined by claim 10 wherein said second impedance means of a given one of said first plurality of drive-sink switches is common to all of said first plurality of drive-sink switches and said second impedance means of a given one of said second plurality of drive-sink switches is common to all of said second plurality of drive-sink switches whereby conduction of said third transistor in one of said first and in one of said second plurality of drive-sink switches reverse biases the base-emitter junction of said third transistor in all other drive-sink switches.

13. Apparatus as defined by claim 12 wherein said first and second impedance means each comprises a resistor.

14. Apparatus as defined by claim 12 wherein two drive current sources are provided, one connected to the emitter of said second transistor of each of said first plurality of drive-sink switches and one connected to the emitter of said second transistor of each of said second plurality of drive-sink switches.

15. Apparatus as defined by claim 14 wherein one of said drive current sources is turned on by a store timing signal and the other is turned on by a read timing signal.

16. Apparatus as defined by claim 15 wherein:

said core memory drive system includes third and fourth plurality of drive-sink switches for lines transverse to lines connected to said first and second plurality of drive-sink switches in a coincident-current core memory;

one of said drive current sources is connected to said third plurality of drive-sink switches;

the other of said drive current sources is connected to said fourth plurality of drive-sink switches; and each drive current source provides half-select current for a given core having transverse lines passing therethrough, each providing a single turn winding therefor.